United States Patent
Kubo

(10) Patent No.: US 8,967,760 B2
(45) Date of Patent: Mar. 3, 2015

(54) POWER SUPPLY SYSTEM AND INK-JET IMAGE FORMING APPARATUS

(71) Applicant: Brother Kogyo Kabushiki Kaisha, Nagoya-shi, Aichi-ken (JP)

(72) Inventor: Isao Kubo, Tokoname (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/227,556

(22) Filed: Mar. 27, 2014

(65) Prior Publication Data

US 2014/0327718 A1    Nov. 6, 2014

(30) Foreign Application Priority Data

May 1, 2013    (JP) .................... 2013-096476

(51) Int. Cl.
  B41J 2/045   (2006.01)
  H02M 3/335   (2006.01)
  B41J 2/07    (2006.01)

(52) U.S. Cl.
  CPC .............. *H02M 3/33553* (2013.01); *B41J 2/07* (2013.01)
  USPC ........................................... 347/19; 347/17

(58) Field of Classification Search
  CPC .. B41J 2/0458; B41J 2/04563; B41J 2/04541; B41J 2/0454; H02M 3/1588; A61B 2018/00666; A61B 2018/22791; A61B 2018/00827; A61B 2018/00892
  USPC ..................... 347/14, 17, 19, 50, 58
  See application file for complete search history.

(56) References Cited

U.S. PATENT DOCUMENTS

| | | | |
|---|---|---|---|
| 7,600,841 B2 * | 10/2009 | Sato | ............................... 347/14 |
| 2007/0229564 A1 | 10/2007 | Oda | |
| 2012/0113685 A1 | 5/2012 | Inukai | |
| 2013/0031396 A1 | 1/2013 | Inukai | |
| 2013/0111237 A1 | 5/2013 | Inukai | |

FOREIGN PATENT DOCUMENTS

| | | |
|---|---|---|
| JP | 2005-070628 A | 3/2005 |
| JP | 2007-268727 A | 10/2007 |
| JP | 2012-105378 A | 5/2012 |
| JP | 2013-031337 A | 2/2013 |

* cited by examiner

*Primary Examiner* — Thinh Nguyen
(74) *Attorney, Agent, or Firm* — Merchant & Gould PC

(57) ABSTRACT

A power supply system includes: a switching power supply configured to rectify and smooth an alternating current voltage of an alternating current power supply and generate a direct current voltage; a small-capacity power supply having a power supply capacity smaller than a power supply capacity of the switching power supply; a sensor configured to output a detection voltage corresponding to a detection target; and a control device. The control device comprises: a reference voltage generation circuit configured to be fed with power from the small-capacity power supply and generate a reference voltage, a comparison circuit configured to compare the detection voltage output from the sensor with the reference voltage and generate a comparison voltage corresponding to the comparison result of the comparison circuit, and a monitoring unit configured to monitor the detection target based on the comparison voltage during the switching power supply is stopped.

14 Claims, 11 Drawing Sheets

*FIG. 5*

|  | TEMPERATURE RANGE | TEMPERATUR [°C] | PWM SETTING [h] | COEFFICIENT [TK] |
|---|---|---|---|---|
| 0000 | TEMPERATURE RANGE 1 |  |  | 0.5 |
|  |  | 5 | B0 |  |
| 0001 | TEMPERATURE RANGE 2 |  |  | 0.6 |
|  |  | 10 | A4 |  |
| 0010 | TEMPERATURE RANGE 3 |  |  | 0.7 |
|  |  | 15 | 98 |  |
| 0011 | TEMPERATURE RANGE 4 |  |  | 0.8 |
|  |  | 20 | 8C |  |
| 0100 | TEMPERATURE RANGE 5 |  |  | 0.9 |
|  |  | 25 | 80 |  |
| 0101 | TEMPERATURE RANGE 6 |  |  | 1.0 |
|  |  | 30 | 74 |  |
| 0110 | TEMPERATURE RANGE 7 |  |  | 1.2 |
|  |  | 35 | 68 |  |
| 0111 | TEMPERATURE RANGE 8 |  |  | 1.4 |
|  |  | 40 | 5E |  |
| 1000 | TEMPERATURE RANGE 9 |  |  | 1.6 |
|  |  | 45 | 54 |  |
| 1001 | TEMPERATURE RANGE 10 |  |  | 1.8 |
|  |  | 50 | 4B |  |
| 1010 | TEMPERATURE RANGE 11 |  |  | 2.0 |

POWER SUPPLY SYSTEM AND INK-JET IMAGE FORMING APPARATUS

CROSS REFERENCE TO RELATED APPLICATION

This application is based upon and claims the benefit of priority of Japanese Patent Application No. 2013-096476 filed on May 1, 2013, the contents of which are incorporated herein by reference in its entirety.

BACKGROUND

The invention relates to a power supply system and an inkjet image forming apparatus having the power supply system, and more particularly, to a technology of a power supply system including a switching power supply.

For example, JP-A-2013-031337 discloses a technology of a power supply system including a switching power supply. In the document, a small-capacity power supply that directly rectifies and smoothes an alternating current voltage to be applied to two capacitors is provided separately from the switching power supply and the small-capacity power supply is enabled to serve as a power supply of a control circuit upon oscillation stop of the switching power supply.

SUMMARY

According to the above technology, it is possible to feed power to a circuit, which is required to minimally operate upon the oscillation stop of the switching power supply, such as an RTC circuit and the like, in a power-saving manner. However, for example, when the power supply as described above is adopted as a power supply of an inkjet printer (an ink jet image forming apparatus), the power saving effect may be lowered. That is, in the inkjet printer of the related art, a surrounding temperature (environmental temperature) of an ink head is periodically monitored using a temperature sensor so as to determine timing of a periodic maintenance of the ink head. For this reason, when it is intended to periodically detect the surrounding temperature even upon the oscillation stop of the switching power supply, the power of the small-capacity power supply is not sufficient, so that if the switching power supply is periodically operated, the power is consumed to detect the temperature. As a result, it is difficult to save the power.

The invention is to provide a technology of saving power when monitoring a detection target by a sensor, upon stop of a switching power supply.

A power supply system comprises:
a switching power supply configured to rectify and smooth an alternating current voltage of an alternating current power supply and generate a direct current voltage;
a small-capacity power supply having a power supply capacity smaller than a power supply capacity of the switching power supply;
a sensor configured to output a detection voltage corresponding to a detection target; and
a control device,
wherein the control device comprises:
a reference voltage generation circuit configured to be fed with power from the small-capacity power supply and generate a reference voltage,
a comparison circuit configured to compare the detection voltage output from the sensor with the reference voltage and generate a comparison voltage corresponding to the comparison result of the comparison circuit, and
a monitoring unit configured to monitor the detection target based on the comparison voltage during the switching power supply is stopped.

An ink jet image forming apparatus comprising:
an image forming unit including an ink head having a plurality of nozzle groups injecting ink, the image forming unit configured to form an image; and
a power supply system comprising:
a switching power supply configured to rectify and smooth an alternating current voltage of an alternating current power supply and generate a direct current voltage to be applied to the image forming unit so that the image forming unit forms the image;
a small-capacity power supply having a power supply capacity smaller than a power supply capacity of the switching power supply;
a temperature sensor provided at a periphery of the ink head, the temperature sensor being configured to output a detection voltage corresponding to an environmental temperature of the ink head; and
a control device comprising:
a reference voltage generation circuit configured to be fed with power from the small-capacity power supply and generate a reference voltage,
a comparison circuit configured to compare the detection voltage output from the sensor with the reference voltage and generate a comparison voltage corresponding to the comparison result of the comparison circuit, and
a monitoring unit configured to monitor the detection target based on the comparison voltage during the switching power supply is stopped,
wherein the image forming unit forms the image by using the direct current voltage supplied from the switching power supply,
wherein the sensor is a temperature sensor that is provided at a periphery of the ink head and is configured to detect the environmental temperature around the ink head as the detection voltage.

BRIEF DESCRIPTION OF DRAWINGS

FIG. 5 is a table showing a relation of a temperature range and a PWM setting value.

DESCRIPTION OF EXEMPLARY EMBODIMENTS

Illustrative Embodiments

An illustrative embodiment will be described with reference to FIGS. 1 to 10.

1. Description of Printer

Figure 1:
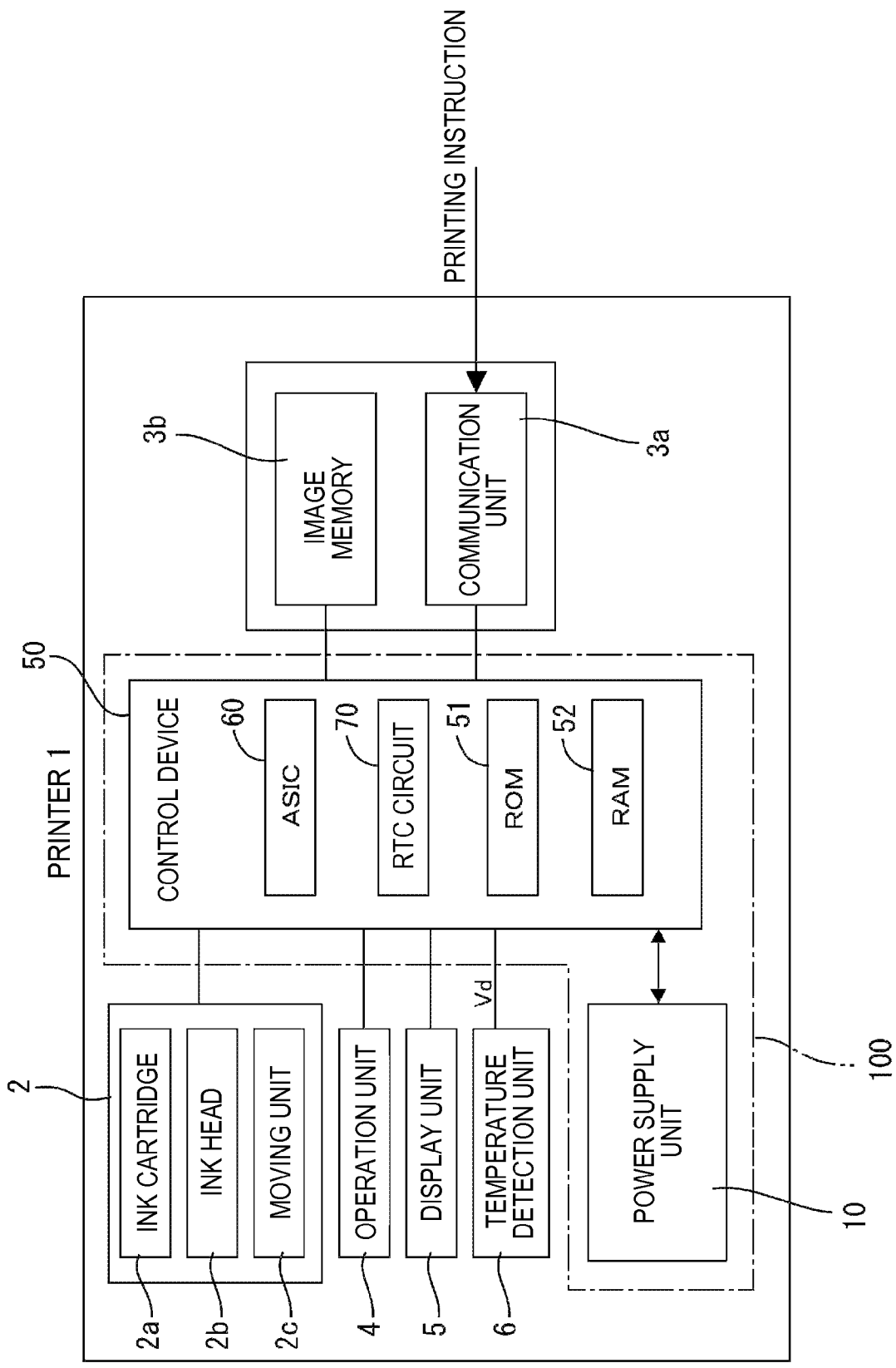
FIG. 1 is a block diagram showing a schematic configuration of an ink jet printer according to an illustrative embodiment.

As shown in FIG. 1, an inkjet printer (hereinafter, simply referred to as 'printer') 1, which is an example of the ink jet image forming apparatus, has a printing unit (which is an example of the image forming unit) 2, a communication unit 3a, an image memory 3b and a power supply system 100. The power supply system 100 has a power supply unit 10 and a control device 50. The power supply unit 10 is a power supply of the printer 1 and feeds power to respective units in the printer 1, the printing unit 2, the communication unit 3a, the image memory 3b, the control device 50 and the like.

The printing unit 2 includes a plurality of ink cartridges 2a corresponding to a plurality of colors, an ink head 2b having a plurality of nozzle groups injecting inks of the ink cartridges 2a, a moving unit 2c moving the ink head 2b, and the like.

The communication unit 3a performs communication with an information terminal apparatus such as a PC and the like, and has a function of receiving a printing instruction or print data from the information terminal apparatus. The image memory 3b temporarily stores therein the print data received from the information terminal apparatus.

The control device 50 includes an ASIC (an IC for specific utility) 60, an RTC (real time clock) circuit 70, a ROM 51, a RAM 52 and the like. The control device 50 is connected with the printing unit 2, the communication unit 3a, the image memory 3b, an operation unit 4, a display unit 5, a temperature detection unit 6 and the like.

When the communication unit 3a receives the printing instruction and print data from the information terminal apparatus, the control device 50 enables the printing unit 2 to execute printing processing, so that the printer 1 prints the print data on a recording medium. The temperature detection unit 6 is provided at the periphery of the ink head 2b. In the meantime, while an operating voltage of the printing unit 2 is mainly 31V, operating voltages of the communication unit 3a, the image memory 3b and the control device 50 are mainly 3.3V.

In the meantime, the printer 1 has a normal mode and a power saving mode as operating modes. The normal mode is a mode where the printer 1 can immediately execute the printing processing in response to the printing instruction. For this reason, in the normal mode, the power supply system 100 and the control device 50 are under operation. Also, the power saving mode is a mode where there is no printing instruction for a predetermined time period and the printer 1 is at a standby state. In the power saving mode, the power supply system 100 and the control device 50 are only partially operating.

2. Configuration of Power Supply System

Figure 2:
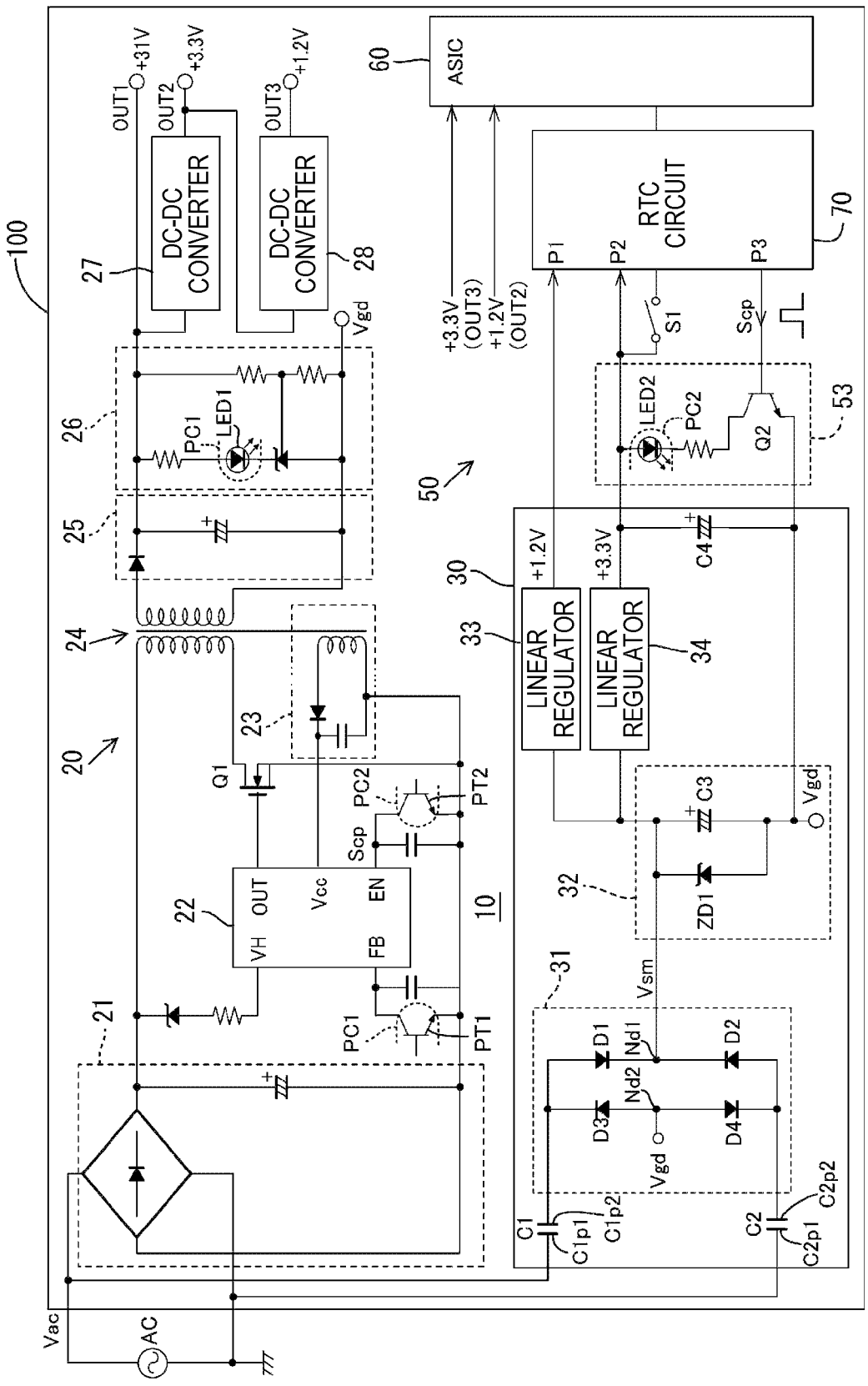
FIG. 2 is a block diagram showing a schematic configuration of a power supply system according to an illustrative embodiment.

A configuration of the power supply system 100 is described with reference to FIGS. 2 and 3. As shown in FIG. 2, the power supply unit 10 of the power supply system 100 includes a switching power supply 20 and a small-capacity power supply 30.

2-1. Switching Power Supply

The switching power supply 20 includes a rectification smoothing circuit 21, a control IC 22, a voltage generation circuit 23, a transformer 24, a FET (field effect transistor) Q1, a rectification smoothing circuit 25, a voltage detection circuit 26 and DC-DC converters 27, 28.

The switching power supply 20 rectifies and smoothes an alternating current voltage Vac of an alternating current power supply AC, and generates direct current voltages of +31V, +3.3V and +1.2V in the normal mode. The direct current voltage of +31V (hereinafter, referred to as 'DC 31V') is output from a first output terminal OUT1, the direct current voltage of +3.3V (hereinafter, referred to as 'DC 3.3V') is output from a second output terminal OUT2 and the direct current voltage of +1.2V (hereinafter, referred to as 'DC 1.2V') is output from a third output terminal OUT3.

The rectification smoothing circuit 21 is a so-called capacitor input type and includes a bridge diode that rectifies an alternating current voltage (240V) of the alternating current power supply AC and a capacitor that smoothes the rectified voltage. An output of the rectification smoothing circuit 21 is applied to a primary coil of the transformer 24.

The transistor Q1 is an N-channel MOSFET and becomes on/off by an on/off signal (PWM signal) that is applied to a gate thereof from the control IC 22. Thereby, a primary side of the transformer 24 oscillates and a voltage is induced to a secondary coil of the transformer 24.

Also, the primary side of the transformer 24 is provided with the voltage generation circuit 23. The voltage generation circuit 23 generates a power supply voltage Vcc for the control IC 22 by rectifying and smoothing a voltage that is induced to an auxiliary coil provided at the primary side of the transformer 24.

The rectification smoothing circuit 25 generates DC 31V by rectifying and smoothing the voltage induced to the secondary coil of the transformer 24.

The voltage detection circuit 26 includes a photo coupler PC1 and turns on a light emitting diode LED1 of the photo coupler PC1 in accordance with a detection level of DC 31V output of the switching power supply 20. The photo coupler PC1 includes a photo transistor PT1 that is connected to a feedback port FB of the control IC 22. Thus, a light signal of the light emitting diode LED1 is returned as an electric signal by the photo transistor PT1 and the detection value of the DC 31V output is fed back to the feedback port FB of the control IC 22.

The DC-DC converter 27 converts and outputs DC 31V into DC 3.3V and the DC-DC converter 28 converts and outputs DC 3.3V into DC 1.2V.

The control IC 22 controls the on/off signal to the transistor Q1, in response to a control pulse signal Scp that is input to a control input port EN, thereby controlling the oscillation of the primary side of the transformer 24. In the normal mode, the primary side of the transformer 24 is enabled to oscillate, so that the respective DC voltages are generated. In the power saving mode, the output of the on/off signal to the transistor Q1 is stopped, so that the oscillation of the primary side of the transformer 24 is stopped. That is, in the power saving mode, the DC voltage is not output from the switching power supply 20. In the meantime, when the printer 1 returns to the normal mode from the power saving mode, the control pulse signal Scp from the control device 50 is input to the control input port EN, the oscillation of the primary side of the transformer 24 starts in response to the control pulse signal Scp and each DC voltage is output from the switching power supply 20. That is, in the normal mode of the printer 1, the switching power supply 20 is under the output mode, and in the power saving mode of the printer 1, the switching power supply 20 is under the output stop mode and the operation of the switching power supply 20 is stopped.

2-2. Small-Capacity Power Supply

The small-capacity power supply 30 has a power supply capacity smaller than a power supply capacity of the switching power supply 20 and feeds the power to the RTC circuit 70 of the control device 50 in the power saving mode and the normal mode. That is, the small-capacity power supply 30 feeds the power to the RTC circuit 70 during the stop of the switching power supply 20.

The small-capacity power supply 30 includes a first capacitor C1, a second capacitor C2, a rectification circuit 31, a smoothing circuit 32, linear regulators 33, 34 and a capacitor C4 for electricity storage.

The first capacitor C1 has a first electrode $C1p1$ and a second electrode $C1p2$. The first electrode $C1p1$ is connected to one end of the alternating current power supply AC and the second electrode $C1p2$ is connected to the rectification circuit 31.

The second capacitor C2 has a first electrode $C2p1$ and a second electrode $C2p2$. The first electrode $C2p1$ is connected to the other end of the alternating current power supply AC and the second electrode $C2p2$ is connected to the rectification circuit 31.

The rectification circuit 31 is electrically connected between the second electrode $C1p2$ of the first capacitor C1 and the second electrode of the second capacitor C2 and rectifies the alternating current voltage Vac that is applied to both capacitors C1, C2. In this illustrative embodiment, the rectification circuit 31 is configured by a bridge circuit consisting of four diodes D1, D2, D3, D4. Cathodes of the diodes D1, D2 are connected at a first connection point Nd1, an anode of the diode D1 is connected to the second electrode $C1p2$ of the first capacitor C1 and an anode of the diode D2 is connected to the second electrode $C2p2$ of the second capacitor C2.

Anodes of the diodes D3, D4 are connected at a second connection point Nd2, a cathode of the diode D3 is connected to the second electrode $C1p2$ of the first capacitor C1 and a cathode of the diode D4 is connected to the second electrode $C2p2$ of the second capacitor C2. The second connection point Nd2 is grounded, for example, and becomes a ground potential Vgd (0V).

The smoothing circuit 32 is connected to the rectification circuit 31 and smoothes the rectified alternating current voltage to thus generate a smoothed voltage Vsm. The smoothing circuit 32 includes a smoothing electricity storage capacitor C3 and a zener diode ZD1. The zener diode ZD1 is to suppress an increase of the smoothed voltage Vsm when the alternating current voltage Vac of the alternating current power supply AC increases. In this illustrative embodiment, a zener voltage of the zener diode ZD1 is 5V, for example, and the smoothed voltage Vsm is about 5V.

The linear regulator 34 converts the smoothed voltage Vsm into DC 3.3V and the linear regulator 33 converts the smoothed voltage Vsm into DC 1.2V. DC 3.3V is supplied to the RTC circuit 70 through a port P2 and DC 1.2V is supplied to the RTC circuit 70 through a port P1.

The capacitor C4 for electricity storage is charged by DC 3.3V from the linear regulator 33. The charged power is used for driving current of a light emitting diode LED2 of a photo coupler PC2 when the operating mode is switched from the power saving mode to the normal mode. By appropriately selecting the capacities of the smoothing electricity storage capacitor C3 and capacitor C4 for electricity storage, it is possible to store electricity in correspondence to the necessity of a predetermined voltage, in the power saving mode. In this illustrative embodiment, it is possible to electrically store a power amount that securely drives the light emitting diode LED2 of the photo coupler PC2. For this reason, it is possible to securely restart the switching power supply 20.

In the meantime, the configuration of the switching power supply 20 is not limited to FIG. 2. For example, the rectification circuit 31 may have a half wave rectification circuit configuration. Also, the second connection point Nd2 may not be grounded and may be a reference potential. That is, the printer 1 may not be frame-grounded. Also, the capacitor C4 for electricity storage may be omitted.

2-3. Control Device

The control device 50 includes an ASIC 60, the RTC circuit 70 and an oscillation control unit 53. The ASIC 60 is an example of the second block, and the RTC circuit 70 and the oscillation control unit 53 are an example of the first block.

Figure 3:
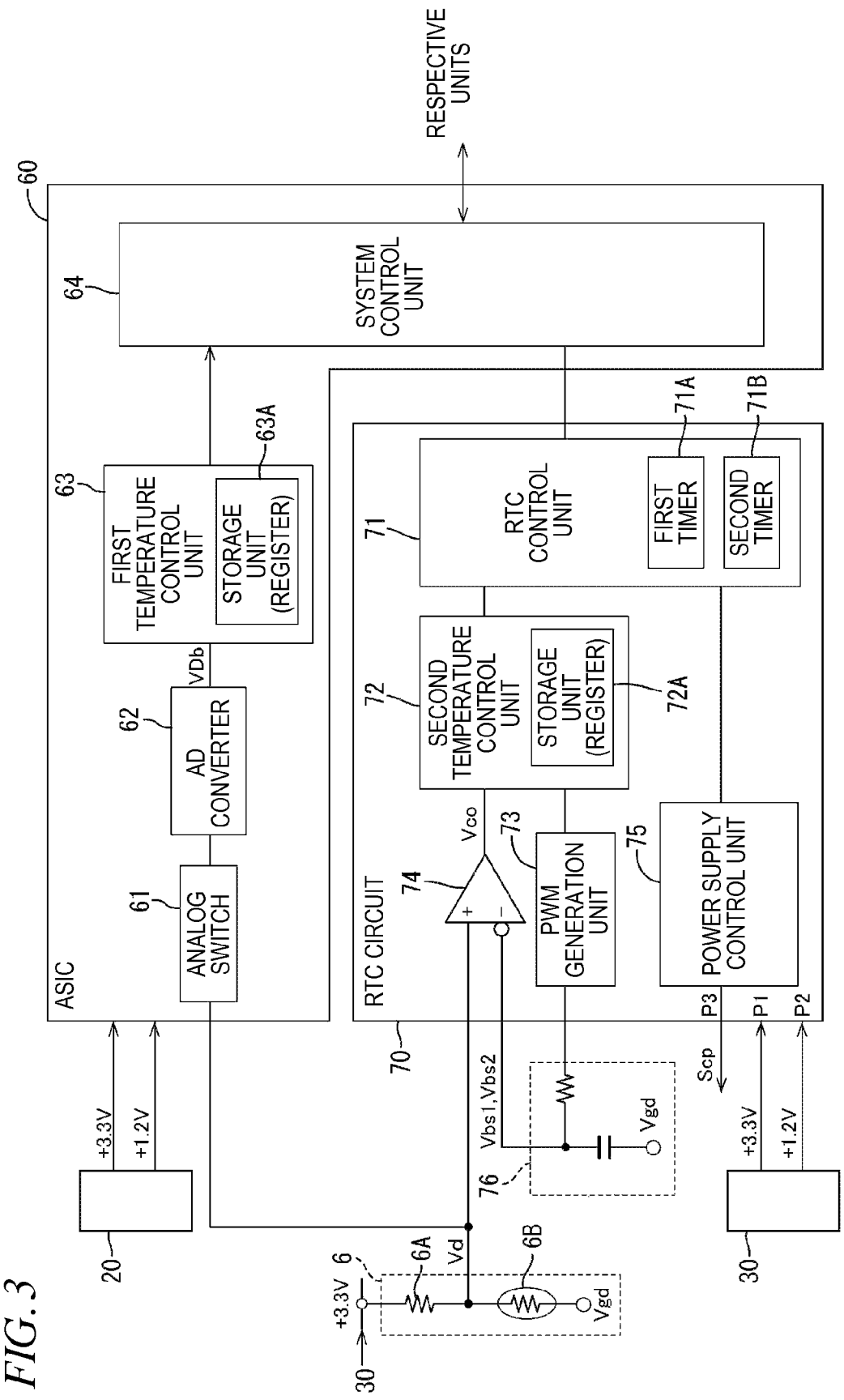
FIG. 3 is a block diagram showing a schematic configuration of a power supply system control device.

As shown in FIG. 3, the ASIC 60 includes an analog switch 61, an AD converter (an example of the conversion circuit) 62, a first temperature control unit 63 and a system control unit 64. The ASIC 60 receives DC 3.3V and DC 1.2V from the switching power supply 20, as power supply. For this reason, the ASIC 60 is fed with the power only during the normal mode and is thus under operation. When the switching power supply 20 is shifted to the output stop mode, i.e., the power saving mode, the power feeding is interrupted, so that the ASIC is stopped.

The analog switch 61 becomes on while the switching power supply 20 operates, receives a thermistor voltage (an example of the detection voltage) from the temperature detection unit 6 and outputs the thermistor voltage Vd to the AD converter 62.

As shown in FIG. 3, the temperature detection unit 6 includes a serially connected resistance 6A and a thermistor 6B (an example of the temperature sensor) provided at the periphery of the ink head $2b$, and detects an environmental temperature Ta around the ink head. The thermistor 6B detects the environmental temperature around the ink head (hereinafter, simply referred to as 'environmental temperature') Ta, as a divided voltage of DC 3.3V from the linear regulator 34 by the resistance 6A. In this illustrative embodiment, the thermistor 6B is an NTC thermistor, for example, and a resistance value thereof decreases as the environmental temperature Ta increases. For this reason, the thermistor voltage Vd decreases as the environmental temperature Ta increases.

The AD converter 62 converts the thermistor voltage Vd, which is an analog value from the temperature detection unit 6, into a digital value, and outputs a thermistor voltage of the digital value (hereinafter, referred to as 'digital thermistor voltage') VDd to the first temperature control unit 63. The digital thermistor voltage VDd is stored in a storage unit 63A of the first temperature control unit 63 and is supplied to the RTC circuit 70 through the system control unit 64.

The system control unit 64 is configured by a CPU, for example, and mainly controls the printing unit 2 of the printer 1. At this time, the system control unit 64 performs purge processing of the ink head $2b$ and the like, which will be described later.

As shown in FIG. 3, the RTC circuit 70 includes an RTC control unit 71, a second temperature control unit 72, a PWM generation unit 73, a comparator 74 and a power supply control unit 75. The RTC circuit 70 receives DC 3.3V and DC 1.2V from the small-capacity power supply 30, as power supply. For this reason, the RTC circuit 70 operates even when the switching power supply 20 is off and is at the output stop state.

The RTC control unit 71 receives the digital thermistor voltage VDd from the system control unit 64 and generates PWM signal data with which the PWM generation unit 73 generates a PWM signal, based on the digital thermistor voltage VDd. The PWM signal data is stored in a storage unit 72A of the second temperature control unit 72 and is supplied to the PWM generation unit 73.

The PWM generation unit 73 generates a PWM signal corresponding to the digital thermistor voltage VDd, based on the PWM signal data, and supplies the PWM signal to a PWM smoothing unit 76. The PWM smoothing unit 76 smoothes the PWM signal to thus generate a reference voltage Vbs. The PWM generation unit 73 and the PWM smoothing unit 76 are an example of the reference voltage generation circuit.

Figure 4:
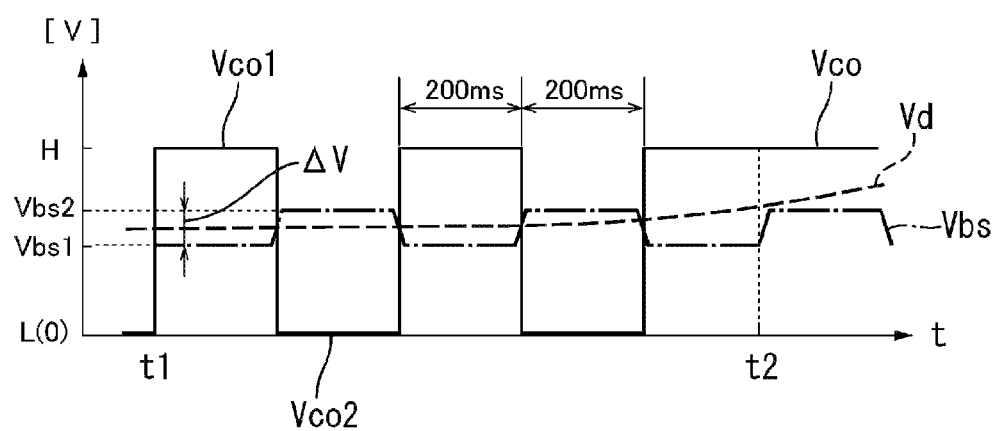
FIG. 4 is a time chart illustrating a comparison voltage.

The thermistor voltage Vd from the thermistor 6B is input to a non-inverting terminal of the comparator 74, and the reference voltage Vbs from the PWM generation unit 73 is input to an inverting input terminal of the comparator 74. As shown in FIG. 4, the comparator 74 compares the thermistor voltage Vd and the reference voltage Vbs to thereby generate a comparison voltage Vco that is changed to an H level and an L level. Here, as shown in FIG. 4, when the thermistor voltage Vd exceeds the reference voltage Vbs, the comparison voltage Vco of an H level is generated.

In this illustrative embodiment, as shown in FIG. 4, the PWM generation unit 73 and the PWM smoothing unit 76 generate the reference voltage Vbs corresponding to an upper limit value of an allowed range of the environmental temperature Ta as a first reference voltage Vbs1 and the reference voltage Vbs corresponding to a lower limit value of the allowed range of the environmental temperature Ta as a second reference voltage Vbs2, respectively, depending on the digital thermistor voltage VDd. At this time, the PWM generation unit 73 and the PWM smoothing unit 76 alternately output the first reference voltage Vbs1 and the second reference voltage Vbs2 to the comparator 74 with a predetermined cycle, for example, with a cycle of 400 ms (millisecond), for example, for a time period of 200 ms, respectively.

In this illustrative embodiment, the allowed range of the environmental temperature Ta is set as eleven temperature ranges 1 to 11, as shown in a table of FIG. 5, for example. For example, in the temperature range 6, a lower limit value of the allowed range is a temperature 25° C., and an upper limit value is a temperature 30° C. At this time, the PWM generation unit 73 generates a PWM signal, based on a PWM setting '74h (hexadecimal)' and the PWM signal is smoothed by the PWM smoothing unit 76, so that the first reference voltage Vbs1 corresponding to the temperature 30° C. is generated. Also, the PWM generation unit 73 generates a PWM signal, based on a PWM setting '80h (hexadecimal)' and the PWM signal is smoothed by the PWM smoothing unit 76, so that the second reference voltage Vbs2 corresponding to the temperature 25° C. is generated. The table of FIG. 5 is stored in the ROM 51, for example.

The comparator 74 compares the thermistor voltage Vd with the first reference voltage Vbs1 and the second reference voltage Vbs2 and continuously generates a first comparison voltage (H level voltage or L level voltage) Vco1 and a second comparison voltage (L level voltage or H level voltage) Vco2 for a time period of 200 ms. The comparison voltage Vco is supplied to the RTC control unit 71 through the second temperature control unit 72.

The RTC control unit (an example of the monitoring unit) 71 includes a first timer 71A and a second timer 71B, and monitors the environmental temperature Ta based on the comparison voltage Vco during the stop of the switching power supply 20, on the basis of the time measurement of the timers 71A, 71B. When monitoring the environmental temperature Ta, the RTC control unit 71 executes determination processing of determining whether the environmental temperature Ta is within the allowed ranged, based on the comparison voltage Vco. Specifically, for example, as shown in FIG. 5, when the comparison voltage Vco changes between the H level and the L level with a predetermined cycle, it is determined that the environmental temperature Ta is within the allowed range. On the other hand, when the comparison voltage Vco does not change between the H level and the L level with a predetermined cycle, it is determined that the environmental temperature Ta is not within the allowed range. Here, the H level is a voltage of 3.3V, for example, and the L level is a voltage of 0 (zero) V.

That is, in FIG. 4, a voltage ΔV from the first reference voltage Vbs1 to the second reference voltage Vbs2 corresponds to the allowed range of the environmental temperature Ta. For this reason, the RTC control unit 71 determines that the environmental temperature Ta is within the allowed range from time t1 to time t2 of FIG. 4 in which the thermistor voltage Vd is between the first reference voltage Vbs1 and the second reference voltage Vbs2 and determines that the environmental temperature Ta is not within the allowed range after the time t2. In FIG. 5, since the thermistor voltage Vd exceeds the reference voltage Vbs after the time t2, it is determined that the environmental temperature Ta is lower than the allowed range.

Like this, when monitoring the environmental temperature Ta during the stop of the switching power supply 20, the two reference voltages Vbs1, Vbs2 are generated, so that it is possible to correctly determine whether the environmental temperature Ta is within the allowed range.

At this time, the PWM generation unit 73 alternately outputs the first reference voltage Vbs1 and the second reference voltage Vbs2 to the comparator 74 with a predetermined cycle. For this reason, it is possible to compare the upper and lower limit values of the environmental temperature Ta with the thermistor voltage Vd by the one comparator 74. The one comparator 74 is provided, so that the power is more saved.

The power supply control unit 75 switches the switching power supply 20 between an output mode and an output stop mode where the oscillation of the switching power supply 20 is stopped, according as a user switches the mode of the printer 1 by a switch S1. That is, the power supply control unit 75 is connected to a base of a transistor Q2 of the oscillation control unit 53 and supplies the control pulse signal Scp to the base of the transistor Q2, so that the light emitting diode LED2 included in the photo coupler PC2 of the oscillation control unit 53 emits the light. Thereby, the photo transistor PT2 included in the photo coupler PC2, which is connected to the control input port EN of the control IC 22 of the switching power supply 20, is controlled. That is, the power supply control unit 75 can switch the switching power supply 20 between the output mode (hereinafter, referred to as 'ON mode') and the output stop mode (hereinafter, referred to as 'OFF mode') by the control pulse signal Scp 3. Temperature Monitoring Control Subsequently, temperature monitoring control of monitoring the environmental temperature Ta around the ink head so as to perform a periodic maintenance of the ink head 2b is described with reference to FIGS. 6 to 10. The periodic maintenance of the ink head 2b is performed every predetermined time period, for example, every four to thirty days so as to favorably maintain a state of the ink head 2b. In this illustrative embodiment, the predetermined time period is four days (refer to FIG. 10).

The temperature monitoring control includes 'table update processing', 'OFF mode shift processing', 'processing during OFF mode' and 'ON mode return processing'.

3-1. Table Update Processing

Figure 6:
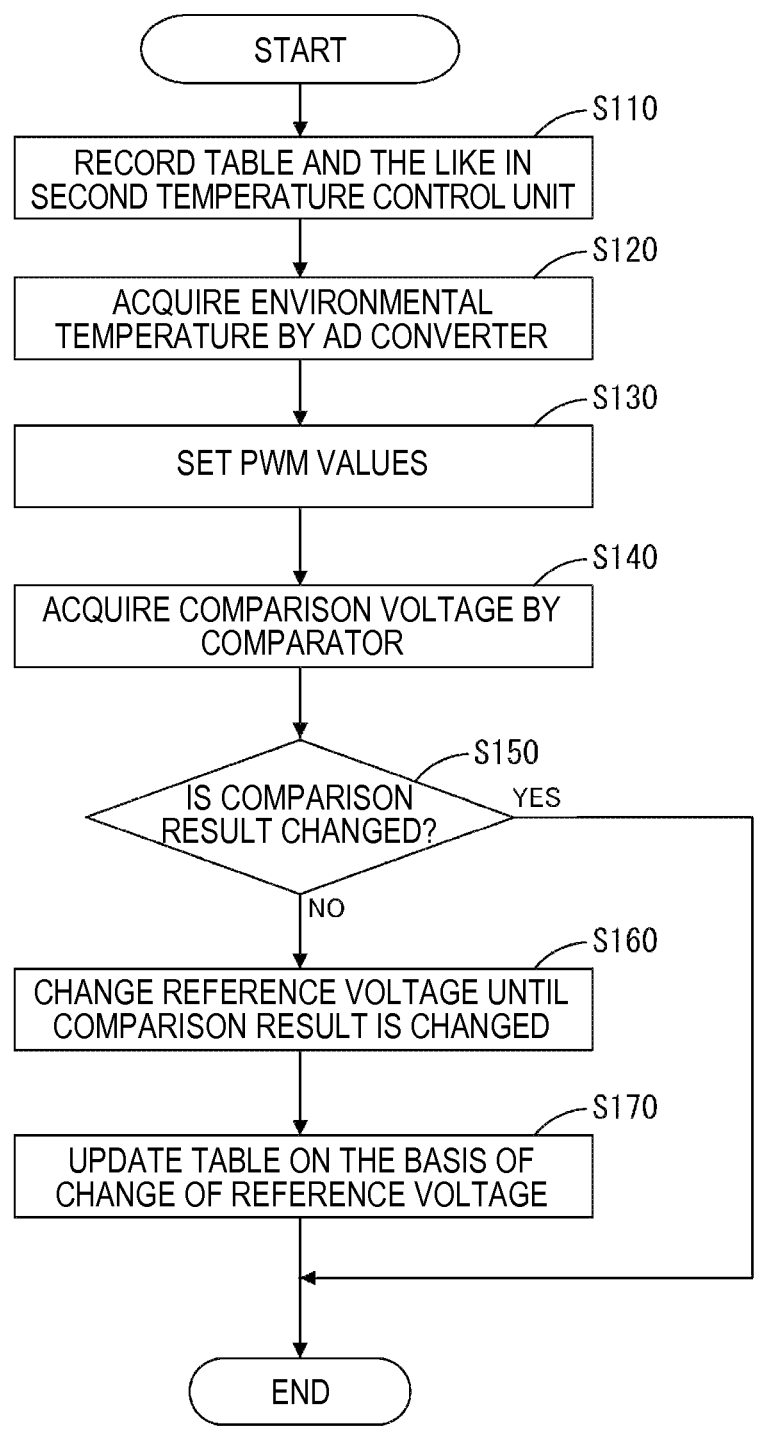
FIG. 6 is a flowchart schematically showing table update processing.

First, the table update processing is described with reference to FIG. 6. The table update processing is performed so as to correct constant non-uniformity that is generated in the first and second reference voltages Vbs1, Vbs2 generated by the PWM generation unit 73 and the PWM smoothing unit 76. The table update processing is performed when the printer 1 becomes ON and is periodically performed at arbitrary timing when the switching power supply 20 becomes ON.

For example, when a power supply plug of the printer 1 is inserted into a power supply outlet and the power supply of the printer 1 becomes ON, the system control unit 64 records 'temperature vs reference voltage table' (FIG. 5) stored in the ROM 51 into the storage unit 72A of the second temperature control unit 72 through the RTC control unit 71 (step S110). In addition, the system control unit 64 reads out the periods of the first and second reference voltages Vbs1, Vbs2, the periodic maintenance time period and the like from the ROM 51 and records the same into the storage unit 72A of the second temperature control unit 72.

Then, the system control unit 64 acquires the environmental temperature upon the power supply ON, i.e., the digital thermistor voltage VDd from the AD converter 62 (step S120). Then, the system control unit 64 determines a temperature range corresponding to the acquired digital thermistor voltage VDd and sets PWM setting values of the determined temperature range (step S130). Here, the temperature range is ±1° C. of the temperature acquired from the AD converter 62, for example, and sets the PWM setting values corresponding the acquired temperature −1° C. and the acquired temperature +1° C. The PWM generation unit 73 and the PWM smoothing unit 76 generate the first and second reference voltages Vbs1, Vbs2 in accordance with the PWM setting values, and the comparator 74 compares the first and second reference voltages Vbs1, Vbs2 with the thermistor voltage Vd. Then, the system control unit 64 acquires the comparison voltage Vco of the comparator 74 (step S140).

Here, the system control unit 64 determines whether the comparison voltage Vco changes between the H level and the L level with change cycles of the first and second reference voltages Vbs1, Vbs2, based on the comparison voltage Vco (step S150). When it is determined that the comparison voltage Vco changes (step S150: YES), the correspondence of the detected environmental temperature and the temperature range is correct. In other words, the system control unit determines that the generated first and second reference voltages Vbs1, Vbs2 are correct and ends this processing without correcting the table while determining that it is not necessary to update the table.

On the other hand, when it is determined that the comparison voltage Vco does not change (step S150: NO), the system control unit 64 changes the PWM setting values until the comparison voltage Vco changes, thereby changing the first reference voltage Vbs1 or second reference voltage Vbs2 (step S160). In this case, for example, a well known binary search method is used. Finally, this processing continues until the PWM setting values belong to the range of the acquired temperature −1° C. and the acquired temperature +1° C.

Then, the system control unit 64 corrects the reference voltage Vbs within another temperature range, i.e., the PWM setting values, based on the change amount (correction amount) of the reference voltage Vbs in step S160, thereby updating the entire table (step S170). Thereby, the table update processing is over.

3-2. OFF Mode Shift Processing

Figure 7:
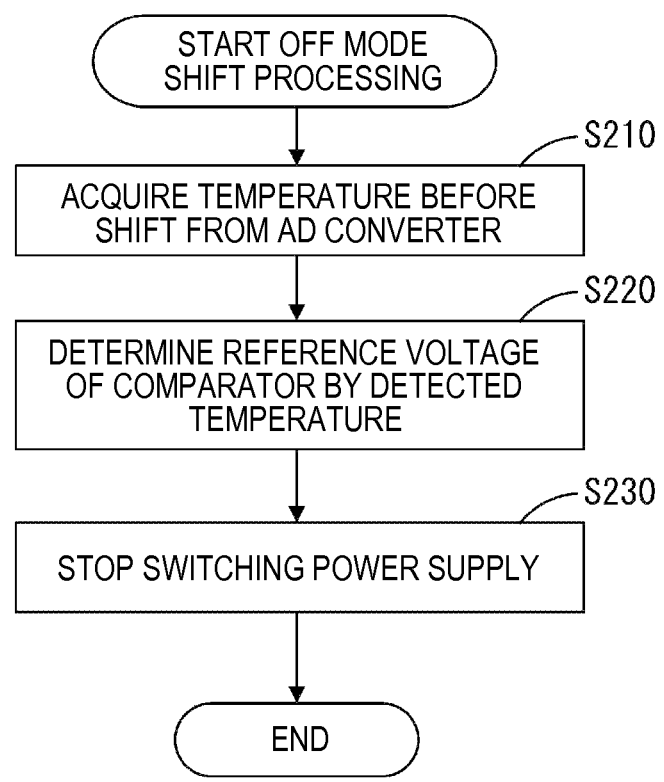
FIG. 7 is a flowchart schematically showing OFF mode shift processing.

Subsequently, the OFF mode shift processing is described with reference to FIG. 7. The OFF mode shift processing is processing that is performed when the mode is shifted from the ON mode to the OFF mode, and is processing that is performed when the power is fed from the switching power supply 20 to the ASIC 60. The OFF mode shift processing is executed when a shift instruction from the ON mode to the OFF mode is issued as the user operates the switch S1, for example.

In the OFF mode shift processing, the system control unit 64 first acquires the digital thermistor voltage VDd before the OFF mode shift from the AD converter 62 and supplies the digital thermistor voltage VDd to the RTC control unit 71 (step S210). The RTC control unit 71 determines a temperature range corresponding to the acquired digital thermistor voltage VDd by referring to the updated 'temperature vs reference voltage table' stored in the storage unit 72A of the second temperature control unit 72. Then, the RTC control unit 71 determines the PWM setting values corresponding to the determined temperature range (step S220).

That is, the RTC control unit 71 determines the first and second reference voltages Vbs1, Vbs2, which are generated by the PWM generation unit 73 and the PWM smoothing unit 76 when stopping the switching power supply 20, based on the digital thermistor voltage (an example of the detection voltage) VDd. Like this, the information relating to the detection target upon the stop of the switching power supply is obtained, so that the monitoring of the monitoring unit during the stop of the switching power supply becomes more proper.

Then, the RTC control unit 71 controls the power supply control unit 75 to generate the control pulse signal Scp that stops the switching power supply 20. The control pulse signal Scp is supplied to the base of the transistor Q2 through the port P3 by the power supply control unit 75, so that the switching power supply 20 is stopped, i.e., becomes at the OFF mode (step S230). Thereby, the OFF mode shift processing is over.

3-3. Processing During OFF Mode

Figure 8:
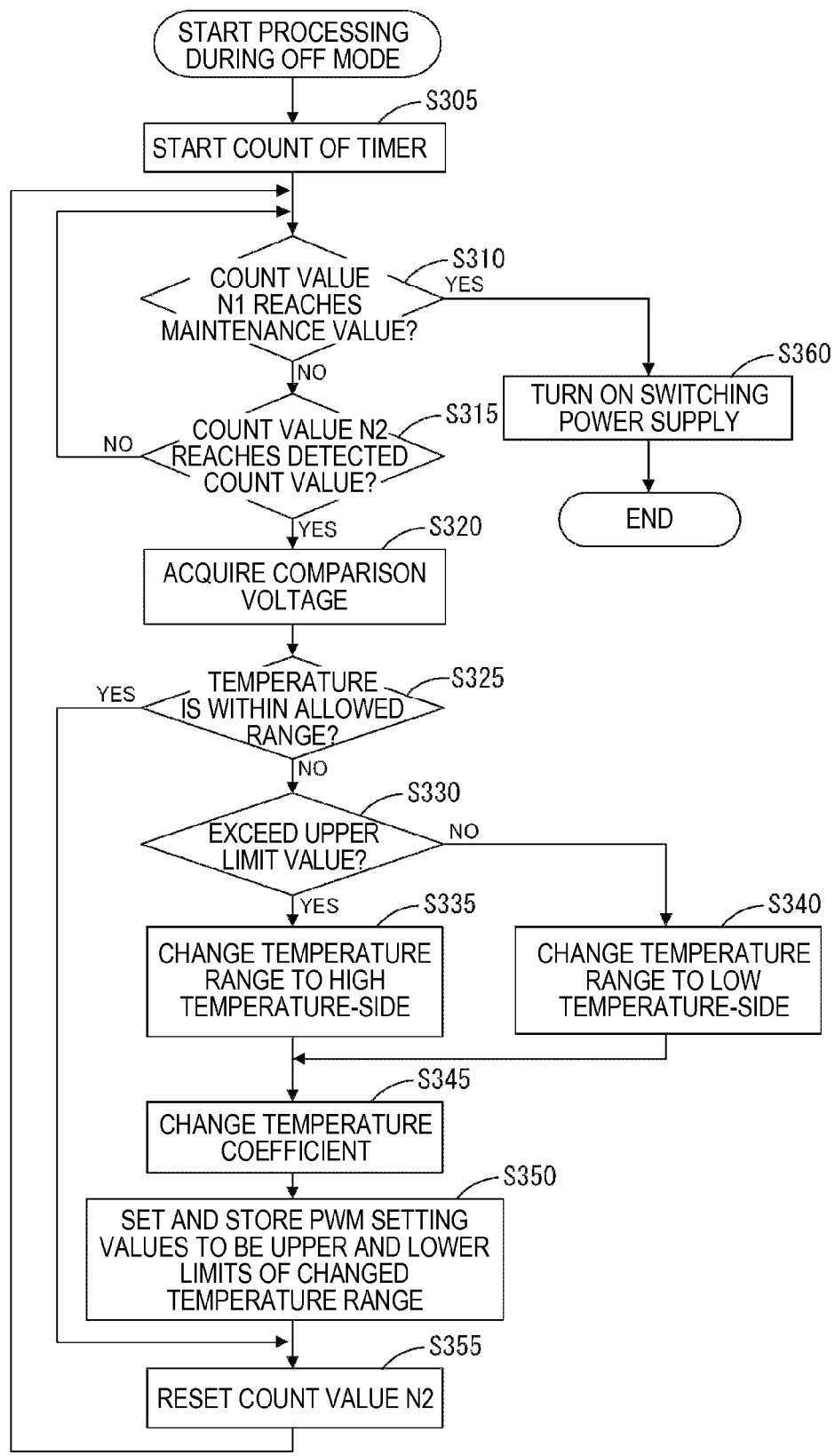
FIG. 8 is a flowchart schematically showing processing during OFF mode.
Figure 10:
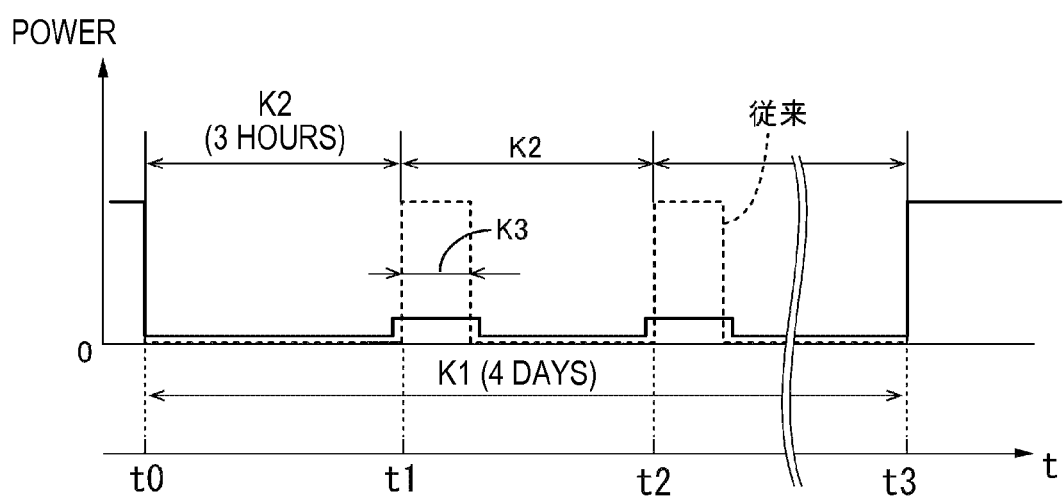
FIG. 10 is a time chart illustrating respective time periods.

Subsequently, the processing during OFF mode that is the monitoring processing of the environmental temperature Ta during the OFF mode is described with reference to FIG. 8. The processing during OFF mode is equivalent to a time period (an example of the return time period) K1 from time t0 to time t3 of FIG. 10. The periodic maintenance of the ink head 2b is performed every time period K1. That is, the time period K1 corresponds to a periodic maintenance interval during the OFF mode. In the meantime, as described above, in this illustrative embodiment, the time period K1 is basically four days. However, the time period K1 is shortened or prolonged, depending on the change in the environmental temperature Ta, as described later. Meanwhile, in FIG. 10, the power consumption of this illustrative embodiment is shown with the solid line and the power consumption of the related art where the switching power supply 20 is activated to detect the digital thermistor voltage VDd is shown with the dotted line. Also, the respective power consumption shown in FIG. 10 shows outlines and is partially exaggerated for convenience of explanations.

In the processing during OFF mode, the RTC control unit 71 first starts a count value N1 of the first timer 71A and a count value N2 of the second timer 71B (step S305). Here, the count value N1 is a predetermined count value (hereinafter, referred to as 'maintenance value') for measuring time corresponding to the time period K1. When the count value N1 reaches the maintenance value, the periodic maintenance is performed.

In the meantime, the count value N2 is a predetermined count value (hereinafter, referred to as 'detected count value') for measuring a detection interval K2 in which the thermistor voltage Vd is detected during the OFF mode. In the meantime, the detection interval K2 is constant. In this illustrative embodiment, the detection interval K2 is three hours, for example.

In the meantime, an addition aspect of the count value N1 is changed as the temperature range is changed by a temperature range coefficient TK shown in FIG. 4. That is, an addition rate of the count value N1 is changed as the temperature range is changed. In this case, the addition of the count value N1 in a next detection interval K2 becomes TK times every count. The addition becomes TK times every count of the count value N1, for example. For example, when the temperature range is changed from 'temperature range 6' to 'temperature range 7', 1 count is added as 1.2 count. For this reason, the time in which the count value N1 reaches the maintenance value is shortened. That is, in this case, the time period K1 is shortened.

In the meantime, when the addition rate of the count value N1 is not changed, i.e., when the temperature range is not changed, the time period K1 is constant and the thermistor voltage Vd is detected 32 times (4×24÷3) in the time period K1.

Then, the RTC control unit 71 determines whether the count value N1 of the first timer 71A reaches the maintenance value (step S310). When it is determined that the count value N1 does not reach the maintenance value (step S310: NO), the RTC control unit 71 determines whether the count value N2 of the second timer 71B reaches the detected count value (step S315).

When it is determined that the count value N2 does not reach the detected count value (step S315: NO), the processing is returned to step S310. On the other hand, when it is determined that the count value N2 reaches the detected count value (step S315: YES), the RTC control unit 71 acquires the comparison voltages Vo1, Vo2 from the comparator 74 (step S320). This case is equivalent to time t1 of FIG. 10. In the meantime, at this time, the comparator 74 compares the first and second reference voltages Vbs1, Vbs2 determined in step S220 of the OFF mode shift processing with the thermistor voltage Vd, respectively.

In this illustrative embodiment, the PWM generation unit 73 generates the reference voltages Vbs1, Vbs2 for predetermined prescribed time K3 (refer to FIG. 10), at the timing of detecting the thermistor voltage Vd, and the RTC control unit 71 monitors the comparison voltage Vco, which is generated by the comparator 74, only when the reference voltages Vbs1, Vbs2 are generated by the PWM generation unit 73. In this case, since the reference voltages Vbs1, Vbs2 are not always generated, the power is more saved during the stop of the switching power supply. For example, every time K2 in which the detection target is monitored, the reference voltages Vbs1, Vbs2 are generated only for time that is required for the detection, for example, only for 1 second. That is, the prescribed time K3 is set to be 1 second, for example.

In the meantime, the invention is not limited to the above and the reference voltages Vbs1, Vbs2 may be always generated by the PWM generation unit 73 during the OFF mode, i.e., in the time period K1.

Then, the RTC control unit 71 determines whether the environmental temperature Ta is within the allowed range, based on the comparison voltages Vo1, Vo2 (step S325: an example of the determination processing). When it is determined that the environmental temperature Ta is within the allowed range (step S325: YES), the RTC control unit resets the count value N2 (step S355) and returns to the processing of step S310.

On the other hand, when it is determined that the environmental temperature Ta is not within the allowed range (step S325: NO), the RTC control unit 71 determines whether the environmental temperature Ta exceeds the upper limit value of the allowed range at that time (step S330). When it is determined that the environmental temperature Ta exceeds the upper limit value of the allowed range (step S330: YES), the RTC control unit changes the allowed range to the high temperature-side (step S335) and correspondingly changes the temperature coefficient TK (step S345: an example of the time period change processing). On the other hand, when it is determined that the environmental temperature Ta does not exceed the upper limit value of the allowed range, i.e., when it is determined that the environmental temperature Ta is below the lower limit value of the allowed range (step S330: NO), the RTC control unit changes the allowed range to the low temperature-side (step S340) and correspondingly changes the temperature coefficient TK (step S345).

Then, the RTC control unit 71 sets the PWM setting values to be the upper and lower limit values of the changed allowed range and stores the upper and lower limit values and the thermistor voltage Vd in the storage unit 72A of the second temperature control unit 72 (step S350). Then, the RTC control unit resets the count value N2 (step S355) and returns to the processing of step S310.

On the other hand, when it is determined in step S310 that the count value N1 reaches the maintenance value (step S310: YES), the RTC control unit 71 controls the power supply control unit 75 to thus generate the control pulse signal Scp that turns on the switching power supply 20. This case is equivalent to time t3 of FIG. 10. The control pulse signal Scp is supplied to the base of the transistor Q2 by the power supply control unit 75, so that the switching power supply 20 is returned, i.e., becomes at the ON mode (step S360: an example of the return processing). Thereby, the processing during OFF mode is over.

Like this, in the processing during OFF mode, the RTC control unit 71 monitors the environmental temperature Ta, so that it is possible to reduce the power consumption relating to the detection of the environmental temperature Ta in the maintenance interval K1, compared to the related art shown with the dotted line in FIG. 10 where the switching power supply 20 is activated every detection interval K2 and the environmental temperature Ta is detected by the AD converter.

3-4. ON Mode Return Processing

Figure 9:
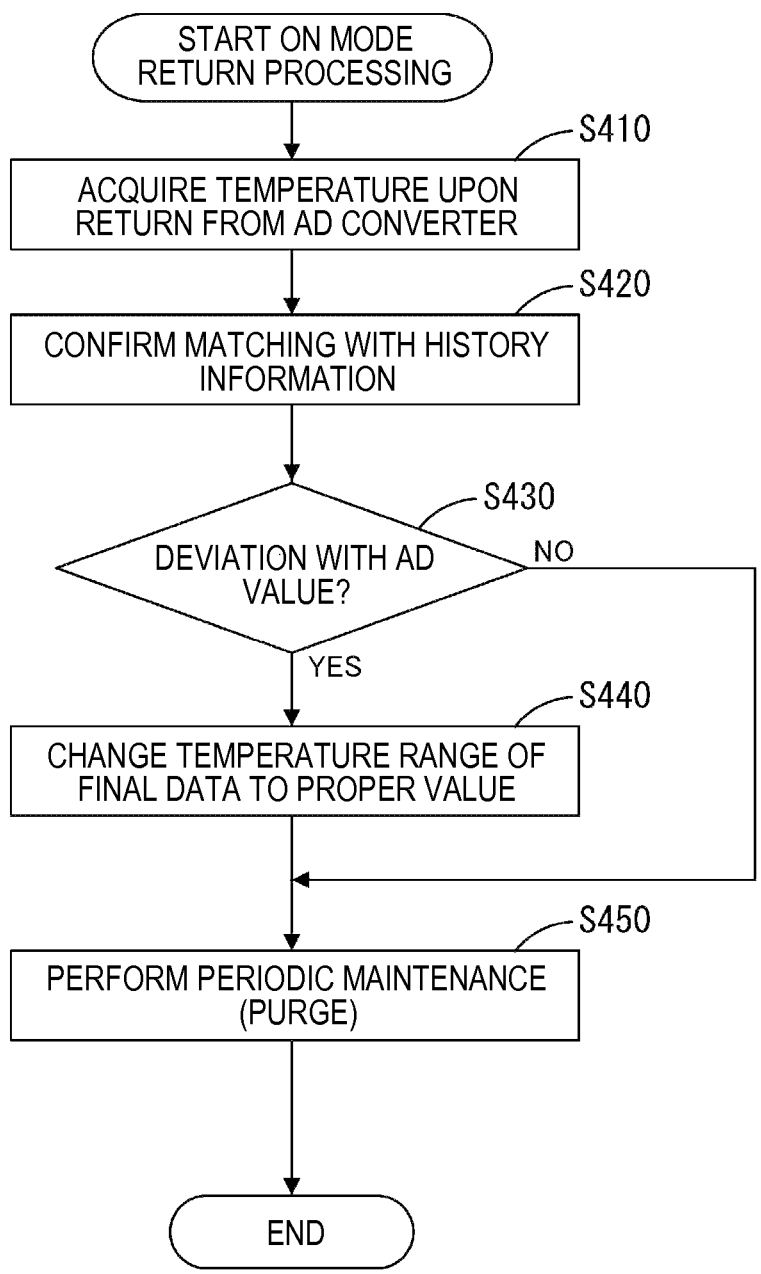
FIG. 9 is a flowchart schematically showing ON mode return processing.

The ON mode return processing that is performed just after the switching power supply 20 is returned to the ON mode is described with reference to FIG. 9.

In the ON mode return processing, the system control unit 64 acquires the digital thermistor voltage VDd corresponding to the environmental temperature Ta just after the return from the AD converter 62 (step S410). Then, the system control unit 64 confirms matching of the acquired digital thermistor voltage VDd and the thermistor voltage Vd stored in the storage unit 72A of the second temperature control unit 72 (step S420). Then, the system control unit determines whether there is a deviation between the digital thermistor voltage VDd and the thermistor voltage Vd (step S430).

When it is determined that there is a deviation (step S430: YES), the system control unit 64 changes the temperature range of the final data of the thermistor voltage Vd stored in the storage unit 72A of the second temperature control unit 72 to the temperature range corresponding to the digital thermistor voltage VDd (step S440: an example of the history change processing). At this time, the table stored in the storage unit 72A is updated. Then, the system control unit executes the periodic maintenance processing, i.e., purge processing of the ink head 2b (step S450) and ends this processing. On the other hand, when it is determined that there is no deviation (step S430: NO), the system control unit executes the periodic maintenance processing without changing the temperature range (step S450).

As described above, upon the return of the switching power supply 20 from the OFF mode to the ON mode, when there is a predetermined deviation (an error) between the monitoring history stored in the storage unit 72A and the digital thermistor voltage VDd, the system control unit 64 changes the monitoring history, based on the digital thermistor voltage VDd. That is, when a deviation between the environmental temperature Ta, which is monitored during the stop of the switching power supply 20, and an actual value occurs, the deviation is corrected upon the return of the switching power supply 20 from the stop state. Therefore, the monitoring of the environmental temperature Ta becomes proper upon a next stop of the switching power supply 20. In the meantime, the deviation correction after the return is basically substantially the same as the correction processing of the 'table update processing'.

4. Effects of this Illustrative Embodiment

When detecting the environmental temperature Ta around the ink head, if the AD converter 62 is used during the stop of the switching power supply 20, like the related art, it is also necessary to operate the system control unit 64. At this time, since it is not possible to operate the system control unit with the power that is fed from the small-capacity power supply 30, the switching power supply 20 is returned, so that the AD converter 62 is enabled to detect the temperature by the power of the switching power supply 20. However, the power of 40 mW, for example, is consumed (refer to FIG. 10). On the other hand, when the comparator 74 is used to monitor whether the environmental temperature Ta is within the predetermined temperature range during the stop of the switching power supply 20, like this illustrative embodiment, it is not necessary to operate the system control unit 64. Therefore, it is possible to monitor the environmental temperature Ta with the power that is fed from the small-capacity power supply 30 and the power consumption is also suppressed to about 10 mW, for example (refer to FIG. 10). Thus, it is possible to save the power when monitoring the environmental temperature Ta (the detection target) during the stop of the switching power supply 20.

In this illustrative embodiment, the RTC control unit 71 changes the temperature range (the allowed range), depending on the determination result of the determination processing of step S325, thereby changing the return time period K1 in which the switching power supply 20 is returned from the stop state. For this reason, it is possible to properly set the execution time of the purge processing, which is performed after the return, depending on the change in the environmental temperature Ta. That is, when the environmental temperature Ta exceeds the allowed range, the return time period K1 is shortened, so that it is possible to perform the purge processing at an earlier stage than the standard. Thereby, it is possible to suppress the nozzles of the ink head 2b from being dried due to the high temperature. On the other hand, when the environmental temperature Ta is below the allowed range, the return time period K1 is prolonged, so that it is possible to perform the purge processing at a later stage than the standard. Thereby, it is possible to suppress the purge processing from being performed at unnecessary time.

In this illustrative embodiment, the control device 50 is configured by the RTC circuit 70 (the first block) that includes the reference voltage generation circuit and the comparison circuit and is connected to the switching power supply and small-capacity power supply and the ASIC 60 (the second block) that includes the AD converter 62 and is connected to only the switching power supply 20. For this reason, the ASIC 60 including the AD converter 62 having the high power consumption is not fed with the power from the small-capacity power supply 30 during the stop of the switching power supply 20. Therefore, it is possible to monitor the environmental temperature Ta by the RTC circuit 70, which is fed with the power from the small-capacity power supply 30 during the stop of the switching power supply 20, in the power saving manner.

Other Illustrative Embodiments

The invention is not limited to the illustrative embodiment described above and shown in the drawings. For example, following illustrative embodiments are also included in the technical scope of the invention.

Figure 11:
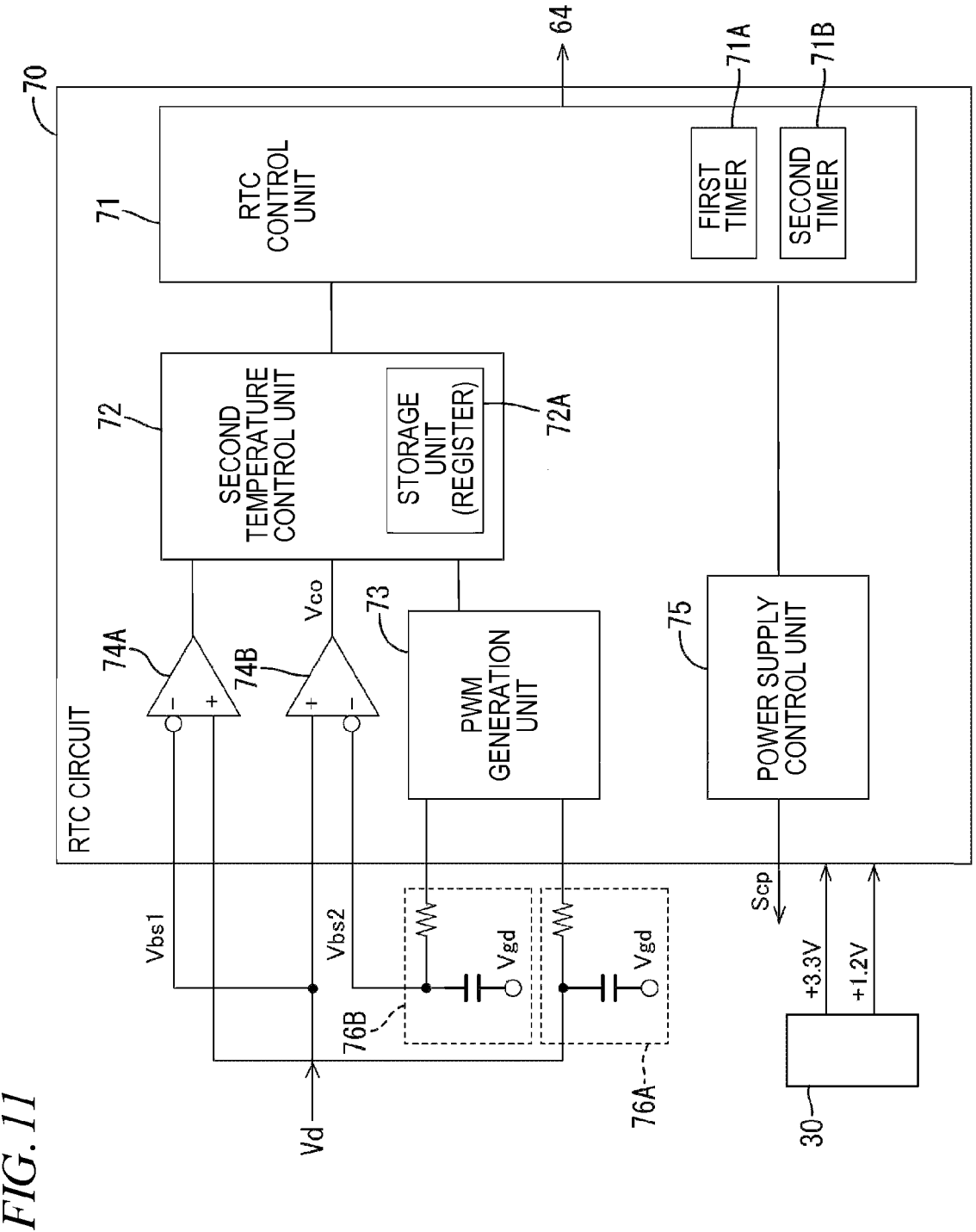
FIG. 11 is a block diagram showing another configuration example of a comparator.

(1) In the above illustrative embodiment, the one comparator 74 receives the first reference voltage Vbs1 and the second reference voltage Vbs2 from the one PWM generation unit 73. However, the invention is not limited thereto. For example, as shown in FIG. 11, two comparators 74A, 74B and two PWM smoothing units 76A, 76B may be provided, the comparator 74A may compare the first reference voltage Vbs1 and the thermistor voltage Vd and the comparator 74B may compare the second reference voltage Vbs2 and the thermistor voltage Vd.

In this case, it is possible to compare the upper and lower limit values of the detection target with the detection voltage of the sensor by the simple processing. Also, since it is possible to perform the comparison processing at the same time, it is possible to shorten the time that is required for the comparison, compared to the configuration where the one comparison circuit is provided. In the meantime, the PWM generation unit for generating the first reference voltage Vbs1 and the PWM generation unit for generating the second reference voltage Vbs2 may be separately provided.

(2) In the above illustrative embodiment, regarding the method of changing the return time period K1 in which the switching power supply is returned from the stop state in accordance with the determination result of the determination processing (step S325), the method of making the detection interval K2 constant and changing the coefficient TK to thus apparently increase or decrease the count value N1 that is counted for each detection interval K2 has been described. However, the invention is not limited thereto.

For example, a configuration may be possible in which the number of detection times of the thermistor voltage Vd is fixed, the coefficient TK is changed to change the detection interval K2, and when the number of detection times reaches the fixed value, it is determined that it reaches the return time period K1 and the switching power supply is returned from the stop state.

The monitoring unit may execute the determination processing every predetermined time, and when it is simply determined by the determination processing that the detection target is not within the allowed range, the switching power supply may be returned from the stop state.

Alternatively, when the number of times of determining that the detection target is not within the allowed range reaches a predetermined number of times, the switching power supply may be returned from the stop state.

A following configuration may be possible. When it is determined that the value of the detection target is not within a predetermined range and the number of determination times is below a predetermined number of times, the values of the first and second reference voltages are changed and a current value of the detection target is detected. Then, the detected value of the detection target is stored in the storage unit 72A and the next monitoring and thereafter is performed with the changed values of the first and second reference voltages. On the other hand, when it is determined that the value of the detection target is within the predetermined range and the number of determination times is below a predetermined number of times, a current value of the detection target is stored in the storage unit and the next monitoring and thereafter is performed with the values of the first and second reference voltages.

(3) In the above illustrative embodiment, the power supply system 100 disclosed in the specification is applied to the image forming apparatus. However, the invention is not limited thereto. The power supply system 100 can be applied to all apparatuses having the normal and power saving modes.

(4) In the above illustrative embodiment, the detection target is the environmental temperature around the ink head. However, the invention is not limited thereto. For example, the detection target may be humidity or temperature and humidity.

(5) In the above illustrative embodiment, the control device 50 is configured by the ASIC 60 (the second block) and the RTC circuit 70 (the first block). However, the invention is not limited thereto. For example, the ASIC 60 and the RTC circuit 70 may be configured by one ASIC. Alternatively, the ASIC 60 and the RTC circuit 70 may be configured by two CPUs and a plurality of logic circuits. Also, regarding the configurations included in the control device 50, the respective configurations included in the ASIC 60 and the RTC circuit 70 are arbitrary. For example, the analog switch 61 and the AD converter 62 may not be included in the ASIC 60. Alternatively, the comparator 74 and the PWM generation unit 73 may not be included in the RTC circuit 70.

(6) In the above illustrative embodiment, the power supply system 100 disclosed in the specification is applied to the ink jet image forming apparatus. However, the invention is not limited thereto. The power supply system 100 can be applied to all apparatuses that have the normal and power saving modes and of which the detection target such as temperature should be detected. For example, the power supply system 100 can be also applied to an electrophotographic image forming apparatus such as a laser printer.

What is claimed is:

1. A power supply system comprising:
a switching power supply configured to rectify and smooth an alternating current voltage of an alternating current power supply and generate a direct current voltage;
a small-capacity power supply having a power supply capacity smaller than a power supply capacity of the switching power supply;
a sensor configured to output a detection voltage corresponding to a detection target; and
a control device comprising:
a reference voltage generation circuit configured to be fed with power from the small-capacity power supply and generate a reference voltage,
a comparison circuit configured to compare the detection voltage output from the sensor with the reference voltage and generate a comparison voltage corresponding to the comparison result of the comparison circuit, and
a monitoring unit configured to monitor the detection target based on the comparison voltage during the switching power supply is stopped.

2. The power supply system according to claim 1, wherein the control device determines a value of the reference voltage based on the detection voltage, when the switching power supply is stopped.

3. The power supply system according to claim 1, wherein the reference voltage generation circuit generates the reference voltage for a predetermined time at a timing at which the detection voltage is detected, and
the monitoring unit monitors the comparison voltage generated by the comparison circuit when the reference voltage generation circuit generates the reference voltage.

4. The power supply system according to claim 1, wherein the reference voltage generation circuit includes a first reference voltage generation circuit configured to generate a first reference voltage corresponding to an upper limit value of an allowed range of the detection target based on the detection voltage, and a second reference voltage generation circuit configured to generate a second reference voltage corresponding to a lower limit value of the allowed range of the detection target based on the detection voltage,
the comparison circuit compares the detection voltage output from the sensor with the first reference voltage to generate a first comparison voltage and compares the detection voltage output from the sensor with the second reference voltage to generate a second comparison voltage, and
the monitoring unit executes determination processing of determining whether the detection target is within the allowed range, based on the first comparison voltage and the second comparison voltage, when the monitoring unit monitors the detection target.

5. The power supply system according to claim 4, wherein the reference voltage generation circuit alternately outputs the first reference voltage and the second reference voltage to the comparison circuit.

6. The power supply system according to claim 4, wherein the comparison circuit comprises:
a first comparison circuit configured to receive the first reference voltage from the first reference voltage generation circuit, and
a second comparison circuit configured to receive the second reference voltage from the second reference voltage generation circuit.

7. The power supply system according to claim 4, wherein the monitoring unit changes a return time period in which the switching power supply is returned from a stop state, depending on a determination result of the determination processing.

8. The power supply system according to claim 1 further comprising a conversion circuit configured to convert the detection voltage output from the sensor into a digital value.

9. The power supply system according to claim 8, wherein the control device comprises:
a first block comprising the reference voltage generation circuit and the comparison circuit, power generated by the small-capacity power supply is supplied to the first block, and
a second block comprising the conversion circuit, the power generated by the switching power supply is supplied to the second block.

10. The power supply system according to claim 1, wherein the control device comprises a storage unit configured to store a monitoring history of the detection target monitored by the monitoring unit during the switching power supply is stopped, and when a predetermined error exists between the detection voltage output from the sensor and the monitoring history at the time in which the switching power supply is returned from the stop state, the control device executes history change processing of changing the monitoring history based on the detection voltage output from the sensor.

11. The power supply system according to claim 1, wherein the small-capacity power supply comprises:
- a first capacitor having a first electrode and a second electrode, the first electrode of the first capacitor being connected to one end of the alternating current power supply;
- a second capacitor having a first electrode and a second electrode, the first electrode of the second capacitor being connected to the other end of the alternating current power supply;
- a rectification circuit that is electrically connected between the second electrode of the first capacitor and the second electrode of the second capacitor and is configured to rectify an alternating current voltage to be applied to the first and second capacitors; and
- a smoothing circuit that is connected to the rectification circuit and configured to smooth the rectified alternating current voltage to generate a smoothed voltage.

12. The power supply system according to claim 1, wherein the detection target is an environmental temperature and the sensor is a temperature sensor.

13. An ink jet image forming apparatus comprising:
- an image forming unit including an ink head having a plurality of nozzle groups injecting ink, the image forming unit configured to form an image; and
- a power supply system comprising:
    - a switching power supply configured to rectify and smooth an alternating current voltage of an alternating current power supply and generate a direct current voltage to be applied to the image forming unit so that the image forming unit forms the image;
    - a small-capacity power supply having a power supply capacity smaller than a power supply capacity of the switching power supply;
    - a temperature sensor provided at a periphery of the ink head, the temperature sensor being configured to output a detection voltage corresponding to an environmental temperature of the ink head; and
    - a control device comprising:
        - a reference voltage generation circuit configured to be fed with power from the small-capacity power supply and generate a reference voltage,
        - a comparison circuit configured to compare the detection voltage output from the sensor with the reference voltage and generate a comparison voltage corresponding to the comparison result of the comparison circuit, and
        - a monitoring unit configured to monitor the detection target based on the comparison voltage during the switching power supply is stopped,
    wherein the image forming unit forms the image by using the direct current voltage supplied from the switching power supply,
    wherein the sensor is a temperature sensor that is provided at a periphery of the ink head and is configured to detect the environmental temperature around the ink head as the detection voltage.

14. The ink jet image forming apparatus according to claim 13,
wherein the reference voltage generation circuit generates a first reference voltage corresponding to an upper limit value of an allowed range of the environmental temperature and a second reference voltage corresponding to a lower limit value of the allowed range of the environmental temperature based on the detection voltage,
wherein the comparison circuit compares the detection voltage output from the temperature sensor with the first reference voltage to generate a first comparison voltage and compares the detection voltage output from the temperature sensor with the second reference voltage to generate a second comparison voltage, and
wherein the monitoring unit executes:
determination processing of determining whether the environmental temperature around the ink head is within the allowed range, based on the first comparison voltage and the second comparison voltage, when monitoring the environmental temperature around the ink head,
time period change processing of, when it is determined in the determination processing that the environmental temperature exceeds the allowed range, shortening a return time period in which the switching power supply is returned from a stop state, and when it is determined that the environmental temperature is below the allowed range, prolonging the return time period, and
return processing of returning the switching power supply from the stop state when the return time period elapses, and
wherein the control device executes purge processing of purging the ink head when the switching power supply is returned from the stop state.

* * * * *